A. E. ODMARK.
VERMIN EXTERMINATOR FOR POULTRY PERCHES.
APPLICATION FILED JULY 30, 1914.
1,155,088. Patented Sept. 28, 1915.
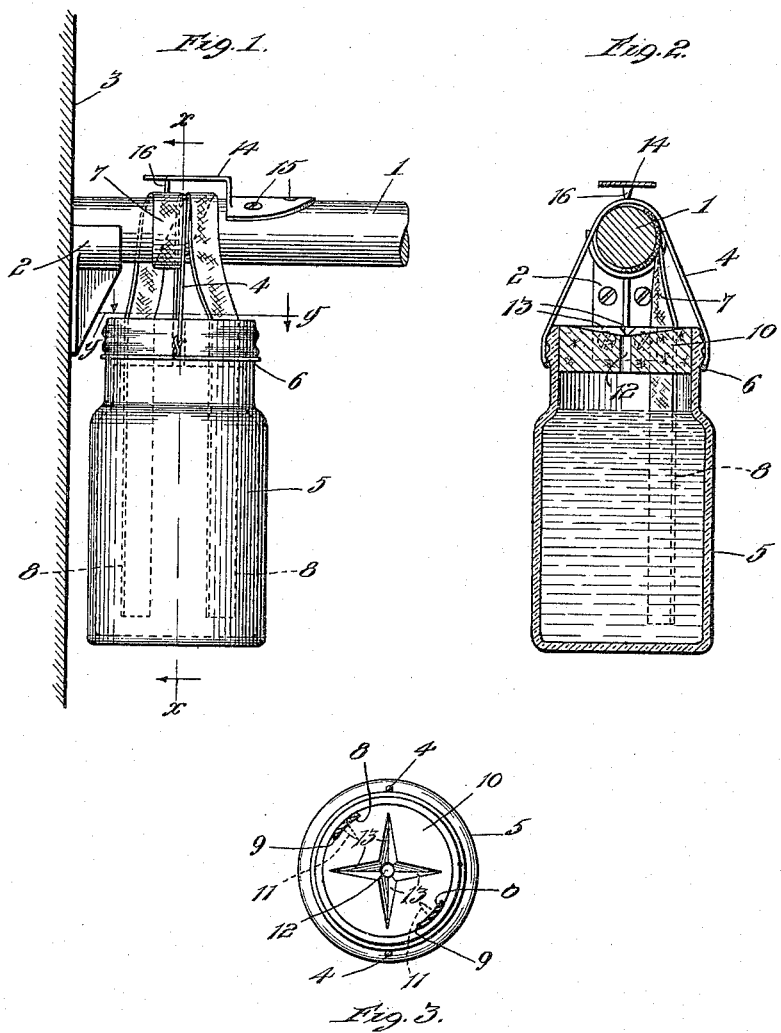

UNITED STATES PATENT OFFICE.

AUGUST ERHARD ODMARK, OF MUSKEGON, MICHIGAN.

VERMIN-EXTERMINATOR FOR POULTRY-PERCHES.

1,155,088.  Specification of Letters Patent.  Patented Sept. 28, 1915.

Application filed July 30, 1914. Serial No. 854,004.

*To all whom it may concern:*

Be it known that I, AUGUST E. ODMARK, a citizen of the United States, and a resident of the city of Muskegon, county of Muskegon, and State of Michigan, have invented certain new and useful Improvements in Vermin-Exterminators for Poultry-Perches, of which the following is a specification.

My invention relates to improvements in vermin exterminators for poultry perches or roosts and has for its object the production of a device of this character adapted to prevent the travel of the vermin along the perch or roost from the ends of the latter to the central portion thereof or that portion occupied by the chickens or other fowl.

A further object is the production of a vermin exterminator as mentioned which will be of economical construction and efficient in use.

Other objects will appear hereinafter.

With these objects in view my invention consists in the combinations and arrangements of parts hereinafter described and claimed.

The invention will be best understood by reference to the accompanying drawing forming a part of this specification, and in which—

Figure 1 is a side elevation of a device embodying my invention showing the same applied to a poultry perch, and Figs. 2 and 3 are sections taken on lines $x$—$x$ and $y$—$y$ respectively of Fig. 1.

The preferred form of construction as illustrated in the drawing is applied to a poultry perch or roost 1 the ends of which are supported by brackets 2 which are fastened to the side walls 3 of the coop or other support. Suspended by means of a bail 4 from the perch 1 adjacent the end thereof is an insecticide container 5, the ends of said bail engaging with a wire member 6 which encircles the neck of said receptacle as shown in the several views. Encircling the perch immediately above the receptacle 5 is a wick 7, the ends 8 of which depend from said perch into the receptacle 5 so as to be immersed in the liquid insecticide contained in said receptacle. Said ends 8 pass through slots 9 formed for the reception thereof in the periphery of closure 10 which closes the upper end or mouth of receptacle 5. Suitable securing devices 11 such as tacks serve to secure the ends 8 of the wick to the closure 10 as clearly shown in Fig. 3.

With the arrangement set forth it will be seen that the liquid insecticide contained in the receptacle 5 will circulate through the wick through capillary attraction. Said wick being wrapped around the perch, the insecticide in circulating through said wick will encircle said perch and thus serve to prevent the passage of vermin from the supported end of the perch to the center of the latter, said wick constituting a barrier against the advance of the vermin along the perch as will be readily understood. This is especially effective against vermin such as mites which hide in the crevices of the hen house or coop during the day and attack the fowls at night. With the present arrangement it will be seen that it will be impossible for vermin of this nature to reach the fowls perched upon the central portion of the perch or roost.

The closure 10 is provided with a central opening 12 to permit of the return of any of the liquid insecticide dripping from the portion of the wick encircling the perch, and inclined grooves 13 are formed in the upper side of said closure for guiding the liquid insecticide thus dripping from the wick toward the opening 12.

Arranged above the encircling portion of the wick is a protector plate 14 secured to the upper side of the perch 1 by means of screws 15. The plate 14 serves as a means of preventing contact of the fowls with the wick. Depending from said plate is a prong 16 which engages with the adjacent portion of the wick in order to prevent relative movement or shifting of the same along the perch. The wick being secured in position by the securing devices 11 and the prong 16, it will be impossible to displace the wick through pecking thereat of the fowls resting upon the perch.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a device of the character described, the combination of a perch; an insecticide container arranged below said perch, said container having an inlet opening at its upper side; a wick encircling said perch at a point directly above said container and having its ends immersed in the insecticide contained in said container; and grooves in the upper side of said receptacle leading to said inlet opening, substantially as described.

2. In a device of the character described, the combination of a perch; an insecticide container arranged below said perch; a wick encircling said perch and having its ends immersed in the insecticide contained in said container; and means for securing said wick ends to said container, substantially as described.

3. In a device of the character described, the combination of a perch; an insecticide container open at its upper end; a closure for said end of said container; and a wick encircling said perch and having its ends passing through openings provided in said closure for immersion in the insecticide contained in said container, substantially as described.

4. In a device of the character described, the combination of a perch; a wick encircling said perch and having its ends immersed in an insecticide; and a protector plate arranged at the upper side of said perch over the encircling portion of said wick, substantially as described.

5. In a device of the character described, the combination of a perch; a wick encircling said perch and having is ends immersed in an insecticide; a protector plate arranged at the upper side of said perch over the encircling portion of said wick; and a prong on said plate engaging the adjacent portion of said wick to lock the same in position, substantially as described.

6. In a device of the character described, the combination of a perch; a wick encircling said perch and having its ends immersed in an insecticide; and means passing through said wick and into said perch for locking said wick in position, substantially as described.

7. In a device of the class described, the combination of a perch; a wick passing over said perch and having its ends immersed in an insecticide, a protector plate arranged at the upper side of said perch over the wick; and means on said plate engaging the adjacent portion of said wick to lock the same in position, substantially as described.

In testimony whereof I have signed my name to this specification in the presence of two subscribing witnesses.

AUGUST ERHARD ODMARK.

Witnesses:
CAESAR J. MEINHARD,
WM. W. BARCUS.

Copies of this patent may be obtained for five cents each, by addressing the "Commissioner of Patents, Washington, D. C."